United States Patent
Niwa

(10) Patent No.: US 10,816,374 B2
(45) Date of Patent: Oct. 27, 2020

(54) SIGNAL PROCESSING APPARATUS AND SYSTEM INCLUDING THE SAME

(71) Applicant: Rohm Co., Ltd., Kyoto (JP)

(72) Inventor: Isao Niwa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 273 days.

(21) Appl. No.: 16/054,333

(22) Filed: Aug. 3, 2018

(65) Prior Publication Data

US 2019/0049277 A1  Feb. 14, 2019

(30) Foreign Application Priority Data

Aug. 10, 2017 (JP) ................................ 2017-155158

(51) Int. Cl.
*G01F 1/66* (2006.01)
*G01F 25/00* (2006.01)

(52) U.S. Cl.
CPC .............. *G01F 1/667* (2013.01); *G01F 1/662* (2013.01); *G01F 25/0007* (2013.01)

(58) Field of Classification Search
CPC ....... G01F 1/667; G01F 25/0007; G01F 1/662
See application file for complete search history.

(56) References Cited

U.S. PATENT DOCUMENTS

| | | | | |
|---|---|---|---|---|
| 6,119,070 A * | 9/2000 | Beneteau | ................ | G01F 1/667 |
| | | | | 702/45 |
| 6,766,276 B1* | 7/2004 | Dury | ....................... | G01F 1/667 |
| | | | | 324/357 |
| 2008/0190213 A1* | 8/2008 | Lang | ....................... | G01F 1/667 |
| | | | | 73/861.28 |
| 2010/0242920 A1* | 9/2010 | Omori | ................... | F02D 41/221 |
| | | | | 123/490 |
| 2015/0362550 A1* | 12/2015 | Wibben | ............... | H02M 3/156 |
| | | | | 324/750.3 |
| 2017/0302288 A1* | 10/2017 | Huang | ................ | H03M 1/1061 |

FOREIGN PATENT DOCUMENTS

JP   2014-157071   8/2014

* cited by examiner

*Primary Examiner* — David Z Huang
(74) *Attorney, Agent, or Firm* — Fish & Richardson P.C.

(57) ABSTRACT

A signal processing apparatus for processing a signal is provided. The apparatus includes a comparator having one input terminal to which a signal is inputted, a first switch configured to switch between application and non-application of a reference voltage, a second switch configured to switch between application and non-application of an envelope reference voltage; a third switch configured to switch between application and non-application of an error detection reference voltage; and a controller configured to perform switching control of the first switch, the second switch and the third switch based on an output of the comparator.

12 Claims, 9 Drawing Sheets

SIGNAL PROCESSING APPARATUS AND SYSTEM INCLUDING THE SAME

CROSS-REFERENCE TO RELATED APPLICATION

This application is based upon and claims the benefit of priority from Japanese Patent Application No. 2017-155158, filed on Aug. 10, 2017, the entire contents of which are incorporated herein by reference.

TECHNICAL FIELD

The present disclosure relates to a signal processing apparatus and a system including the same.

BACKGROUND

Conventionally, there have been various apparatuses for measuring a flow rate of fluid using ultrasonic waves.

An ultrasonic flow meter may include a first ultrasonic sensor arranged on an upstream side where a fluid flows and a second ultrasonic sensor arranged on the downstream side in the related art. A flow rate of a fluid is measured based on the time taken until an ultrasonic wave transmitted from the first ultrasonic sensor is received by the second ultrasonic sensor and the time taken until an ultrasonic wave transmitted from the second ultrasonic sensor is received by the first ultrasonic sensor.

Each of the first ultrasonic sensor and the second ultrasonic sensor has a wedge. The wedge is provided with an ultrasonic transceiver and is installed on the outer peripheral surface of a pipe through which a fluid flows. The wedge causes the ultrasonic wave transmitted from the ultrasonic transceiver to enter the fluid at a desired angle.

In addition, a notch is provided in the wedge. As a result, the pipe propagating wave incident on the wedge is disturbed by the notch making it difficult to reach the ultrasonic transceiver. Therefore, the energy of the pipe propagating wave arriving at the ultrasonic transceiver is made smaller than the energy of the fluid propagating wave, thereby increasing an SN ratio.

As described above, the flow rate of a fluid may be accurately measured in the related art. However, there is no disclosure of a configuration for accurately measuring a flow rate in a sensor signal processing apparatus that processes a sensor signal outputted from an ultrasonic sensor.

SUMMARY

Some embodiments of the present disclosure provide a signal processing apparatus capable of making it possible to accurately measure a flow rate of a fluid and capable of achieving size reduction and low cost.

According to one embodiment of the present disclosure, there is provided a signal processing apparatus for processing a signal. The apparatus includes a comparator having one input terminal to which a signal is inputted; a first switch configured to switch between application and non-application of a reference voltage for setting a zero cross threshold voltage to the other input terminal of the comparator; a second switch configured to switch between application and non-application of an envelope reference voltage for setting an envelope threshold voltage to the other input terminal; a third switch configured to switch between application and non-application of an error detection reference voltage for setting an error detection threshold voltage to the other input terminal; and a controller configured to perform switching control of the first switch, the second switch and the third switch based on an output of the comparator (first configuration).

In a second configuration, the apparatus of the first configuration further includes an amplifier configured to amplify the signal, wherein the controller is configured to switch the error detection reference voltage at two levels, and wherein the controller is configured to adjust a gain of the amplifier according to the output of the comparator in a state in which the error detection reference voltage is applied to the other input terminal.

In a third configuration, the controller of the second configuration is configured to change a voltage dividing ratio by switching between bypassing and non-bypassing both ends of a resistor to switch the error detection reference voltage.

In a fourth configuration, the controller of any one of the first to third configurations is configured to calculate a propagation time of a signal for a predetermined distance based on a plurality of timings at which the signal inputted to the one input terminal intersects the zero cross threshold voltage.

In a fifth configuration, the controller of the fourth configuration is configured to cause the zero cross threshold voltage to be applied to the other input terminal when the signal inputted to the one input terminal becomes equal to or larger than the envelope threshold voltage, cause the error detection threshold voltage to be applied to the other input terminal when the signal inputted to the one input terminal becomes equal to or larger than the zero cross threshold voltage, and then cause the zero cross threshold voltage to be applied to the other input terminal.

In a sixth configuration, in any one of the first to fifth configurations, when the signal inputted to the one input terminal does not become equal to or larger than the envelope threshold voltage before a lapse of a predetermined time, the controller is configured to stop the process of performing the switching control.

In a seventh configuration, the controller on any one of the first to sixth configurations is configured to change the envelope threshold voltage to search for the envelope threshold voltage at which a change amount of a propagation time based on the timing at which the signal inputted to the one input terminal intersects the zero cross threshold voltage becomes equal to or larger than a threshold value, and determine the envelope threshold voltage based on the searched envelope threshold voltage.

In an eighth configuration, the controller of any one of the first to seventh configurations is configured to calculate a propagation time of a signal for a predetermined distance based on a timing at which the signal inputted to the one input terminal intersects the zero cross threshold voltage, and calculates a difference value of the calculated propagation time, and the controller is configured to determine whether the number of difference values calculated in a state in which an error based on the error detection threshold voltage does not occur is equal to or larger than a threshold value, and switch between calculation and non-calculation of a flow rate based on the difference value according to a determination result.

In a ninth configuration, the apparatus of any one of the first to eighth configurations further includes: a first voltage dividing circuit configured to generate the envelope threshold voltage; and a second voltage dividing circuit configured to generate the error detection threshold voltage, wherein the controller is configured to perform switching of a switch included in the first voltage dividing circuit and switching of a switch included in the second voltage dividing circuit, and performs switching of a signal serving as a power supply voltage supplied to the comparator.

In a tenth configuration, the apparatus of any one of the first to ninth configurations includes an H-bridge circuit; and a converter configured to current/voltage-convert the signal outputted via the H-bridge circuit, wherein an output of the converter is inputted to the one input terminal.

In an eleventh configuration, the signal of any one of the first to tenth configurations is an ultrasonic signal.

According to one embodiment of the present disclosure, a system includes the signal processing apparatus of any one of the first to eleventh configurations.

DETAILED DESCRIPTION

Figure 1:
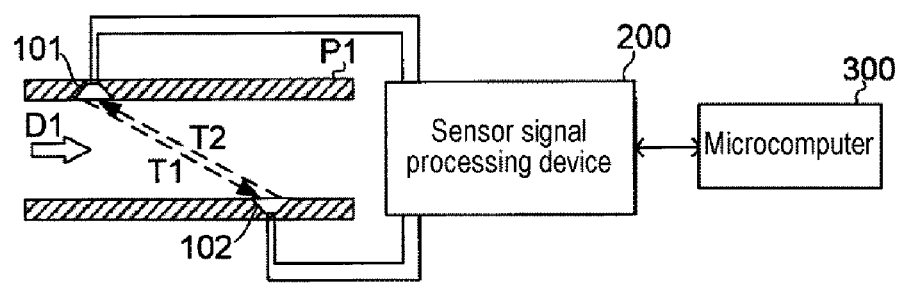
FIG. 1 is a schematic diagram showing a configuration of an ultrasonic sensor system according to an embodiment of the present disclosure.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

1. Configuration of Ultrasonic Sensor System

FIG. 1 is a schematic diagram showing a configuration of an ultrasonic sensor system according to an embodiment of the present disclosure. The ultrasonic sensor system 500 shown in FIG. 1 is a system configured to measure a flow rate of a fluid flowing inside a pipe P1 along an axial direction D1 by using an ultrasonic wave. The ultrasonic sensor system 500 includes a first ultrasonic sensor 101 (a first sensor), a second ultrasonic sensor 102 (a second sensor), a sensor signal processing apparatus 200 and a microcomputer 300. The ultrasonic sensor system 500 may be used, for example, as a gas meter that measures consumption of a city gas or the like. However, the ultrasonic sensor system 500 may be used for other purposes.

The sensor signal processing apparatus 200 is a semiconductor integrated circuit that processes sensor signals outputted from the first ultrasonic sensor 101 and the second ultrasonic sensor 102, respectively. The sensor signal processing apparatus 200 is connected to a microcomputer 300 and is configured to output the processing result of the sensor signals to the microcomputer 300.

The first ultrasonic sensor 101 and the second ultrasonic sensor 102 are installed in a pipe P1. The installation position of the first ultrasonic sensor 101 and the installation position of the second ultrasonic sensor 102 are misaligned in the axial direction D1 of the pipe P1. Specifically, the first ultrasonic sensor 101 is disposed on the upstream side of a fluid flow in the pipe P1 along the axial direction D1, and the second ultrasonic sensor 102 is disposed on the downstream side of the fluid flow.

The sensor signal processing apparatus 200 measures a flow rate of a fluid flowing in the pipe P1 based on a difference between the time T1 and the time T2. The time T1 is the time taken until the ultrasonic wave transmitted from the first ultrasonic sensor 101 is received by the second ultrasonic sensor 102. The time T2 is the time taken until the ultrasonic wave transmitted from the second ultrasonic sensor 102 is received by the first ultrasonic sensor 101.

2. Configuration of Sensor Signal Processing Apparatus

Figure 2:
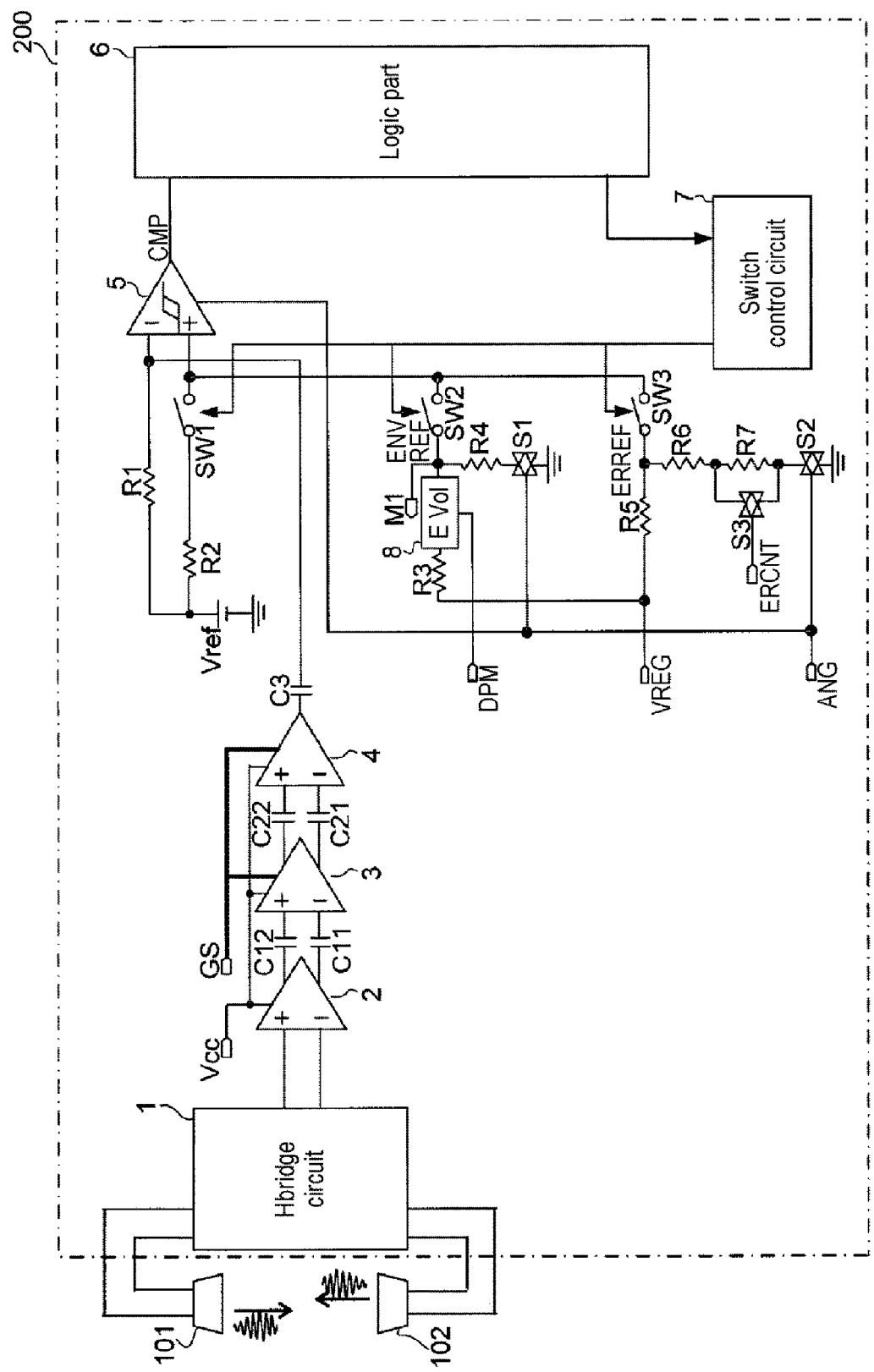
FIG. 2 is a diagram showing a configuration example of a sensor signal processing apparatus according to the present disclosure.

FIG. 2 is a diagram showing a configuration example of the sensor signal processing apparatus 200. The sensor signal processing apparatus 200 mainly includes an H-bridge circuit 1, an I/V amplifier (current/voltage conversion amplifier) 2, a first PGA (programmable gain amplifier) 3, a second PGA 4, a comparator 5, a logic part 6 (controller), a switch control circuit 7, an electronic volume 8, switches SW1 to SW3, and switches S1 to S3.

Figure 3:
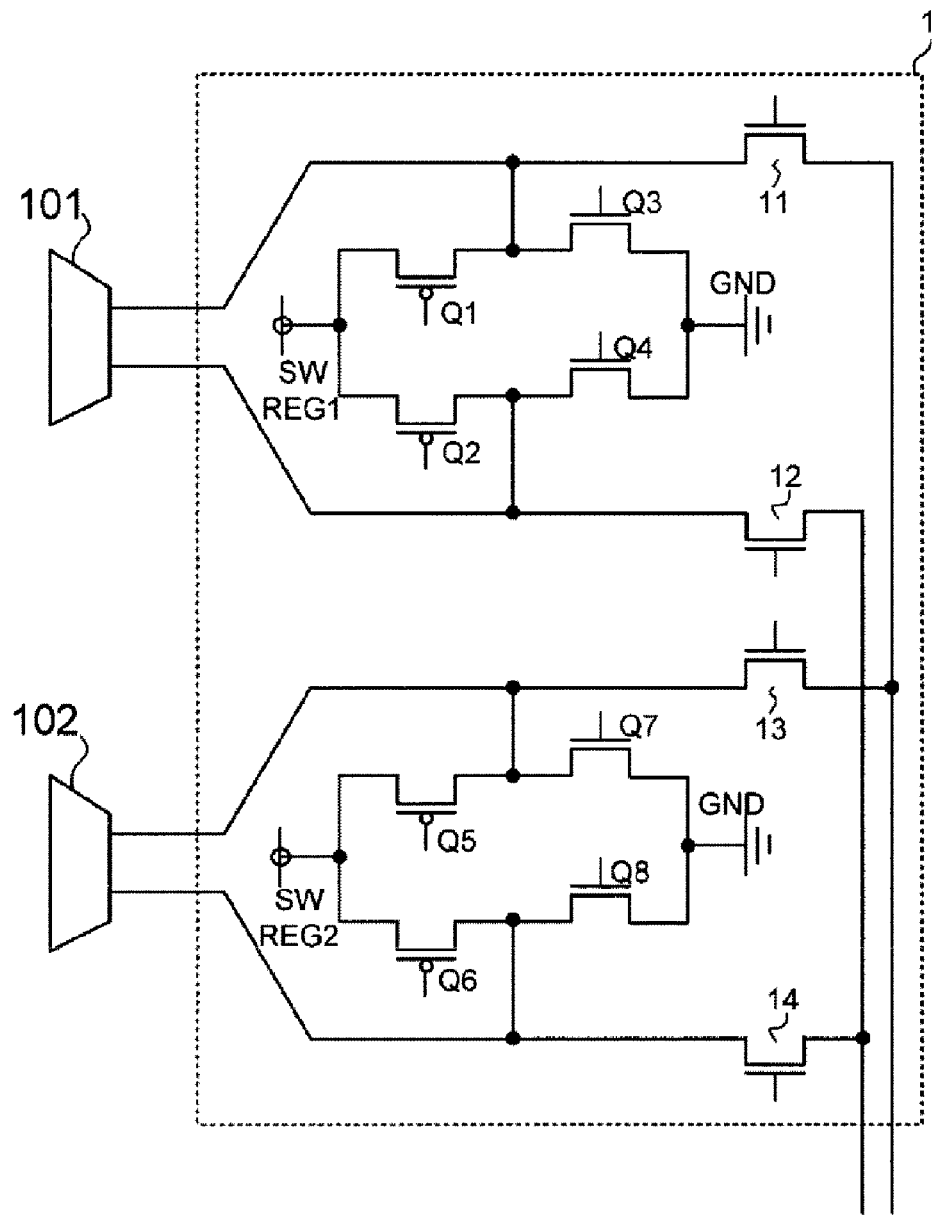
FIG. 3 is a diagram showing a specific configuration example of an H bridge circuit.

The H-bridge circuit 1 is connected to the first ultrasonic sensor 101 and the second ultrasonic sensor 102. A specific configuration example of the H-bridge circuit 1 is shown in FIG. 3. As shown in FIG. 3, the H-bridge circuit 1 includes switches Q1 to Q4 constituting an H bridge, switches Q5 to Q8 constituting an H bridge, and switches 11 to 14.

A predetermined power supply voltage SWREG1 is applied to the source of the switch Q1 which is a p-channel MOSFET and the source of the switch Q2 which is a p-channel MOSFET. The drain of the switch Q1 is connected to the drain of the switch Q3 which is an n-channel MOSFET. The drain of the switch Q2 is connected to the drain of the switch Q4 which is an n-channel MOSFET. A ground potential is applied to the source of the switch Q3 and the source of the switch Q4. One end of the first ultrasonic sensor 101 is connected to a connection node of the switches Q1 and Q3. The other end of the first ultrasonic sensor 101 is connected to a connection node of the switches Q2 and Q4. The switch 11 and the switch 12 are arranged in paths between the respective ends of the first ultrasonic sensor 101 and the respective input ends of the I/V amplifier 2.

A predetermined power supply voltage SWREG2 is applied to the source of the switch Q5 which is a p-channel MOSFET and the source of the switch Q6 which is a p-channel MOSFET. The drain of the switch Q5 is connected to the drain of the switch Q7 which is an re-channel MOSFET. The drain of the switch Q6 is connected to the drain of the switch Q8 which is an n-channel MOSFET. A ground potential is applied to the source of the switch Q7 and the source of the switch Q8. One end of the second ultrasonic sensor 102 is connected to a connection node of the switches Q5 and Q7. The other end of the second ultrasonic sensor 102 is connected to a connection node of the switches Q6 and Q8. The switch 13 and the switch 14 are arranged in paths between the respective ends of the second ultrasonic sensor 102 and the respective input ends of the I/V amplifier 2.

The on/off operation of each of the switches Q1 to Q4 is controlled by the logic part 6. Specifically, when the switches Q1 and Q4 are turned on, the switches Q2 and Q3 are turned off. When the switches Q1 and Q4 are turned off, the switches Q2 and Q3 are turned on. As a result, a pulse-like burst wave may be inputted to the first ultrasonic sensor 101 for driving. When the first ultrasonic sensor 101 is driven, the switches 11 and 12 are turned off. The on/off operation of the switches 11 and 12 is controlled by the logic part 6. When the first ultrasonic sensor 101 is driven, the switches 13 and 14 are turned on. The on/off operation of the switches 13 and 14 is controlled by the logic part 6.

Thus, the ultrasonic wave, which is outputted from the driven first ultrasonic sensor 101 to the pipe P1, is received by the second ultrasonic sensor 102 through the fluid. A current signal as an ultrasonic signal (sensor signal) outputted from the second ultrasonic sensor 102 may be inputted to the I/V amplifier 2 via the switches 13 and 14. In this way, the ultrasonic wave is transmitted from the first ultrasonic sensor 101 on the upstream side to the second ultrasonic sensor 102 on the downstream side.

In addition, the on/off operation of each of the switches Q5 to Q8 is controlled by the logic part 6. Specifically, when the switches Q5 and Q8 are turned on, the switches Q6 and Q7 are turned off. When the switches Q5 and Q8 are turned off, the switches Q6 and Q7 are turned on. As a result, a pulse-like burst wave may be inputted to the second ultrasonic sensor 102 for driving. When the second ultrasonic sensor 102 is driven, the switches 13 and 14 are turned off and the switches 11 and 12 are turned on.

Thus, the ultrasonic wave, which is outputted from the driven second ultrasonic sensor 102 to the pipe P1, is received by the first ultrasonic sensor 101 through the fluid. A current signal as an ultrasonic signal (sensor signal) outputted from the first ultrasonic sensor 101 may be inputted to the I/V amplifier 2 via the switches 11 and 12. In this way, the ultrasonic wave is transmitted from the second ultrasonic sensor 102 on the downstream side to the first ultrasonic sensor 101 on the upstream side.

The I/V amplifier 2 converts the current signal, which is inputted from the H-bridge circuit 1, into a voltage signal and outputs the voltage signal to the first PGA3 via capacitors C11 and C12. The I/V amplifier 2 is driven by a power supply voltage Vcc. The capacitors C11 and C12 are direct current cutting capacitors.

The first PGA3 amplifies the voltage signal inputted from the I/V amplifier 2 using a gain set by a gain setting signal GS and outputs the amplified voltage signal to the second PGA4 via capacitors C21 and C22. The first PGA3 is driven by the power supply voltage Vcc. The capacitors C21 and C22 are direct current cutting capacitors. The gain setting signal GS is set by the logic part 6.

The second PGA4 amplifies the voltage signal, which is inputted from the first PGA3 using the gain set by the gain setting signal GS, and outputs the amplified voltage signal to the subsequent stage side. The second PGA4 is driven by the power supply voltage Vcc. For example, the gain of the first PGA3 is set to 3 bits, and the gain of the second PGA4 is set to 5 bits. That is, the first PGA3 roughly adjusts the amplification in the stage before the second PGA4.

The output terminal of the second PGA4 is connected to a connection node of one end of a resistor R1 and an inverting input terminal (−) of the comparator 5 via a capacitor C3. The capacitor C3 is a direct current cutting capacitor. A predetermined reference voltage Vref is applied to the other end of the resistor R1. The reference voltage Vref is also applied to one end of a resistor R2. The other end of the resistor R2 is connected to a non-inverting input terminal (+) of the comparator 5 via a switch SW1. The reference voltage Vref is used to set a reference level of the ultrasonic signal, which is outputted from the second PGA4. In the zero cross detection using the ultrasonic signal in the comparator 5, the same DC voltage (reference voltage Vref) is applied to both input terminals of the comparator 5 in order to avoid DC noise. The applied DC voltage may be referred to as a zero cross threshold voltage.

A predetermined power supply voltage VREG is applied to one end of a resistor R3. The other end of the resistor R3 is connected to the electronic volume 8. One end of a resistor R4 is connected to the electronic volume 8. The other end of the resistor R4 is connected to an application terminal of a ground potential via the switch S1. On and off of the switch S1 is switched by an analog signal ANG.

When the switch S1 is turned on, the resistance value of the electronic volume 8 is changed according to a setting signal DPM, the voltage dividing ratio of dividing the power supply voltage VREG using the resistors R3 and R4 is adjusted, and the voltage after division is generated as an envelope reference voltage ENVREF at the connection node of the electronic volume 8 and the resistor R4. The setting signal DPM is set by the logic part 6. The envelope reference voltage ENVREF may be monitored by a monitor terminal M1 connected to the connection node. The electronic volume 8, the resistors R3 and R4, and the switch S1 constitute a first voltage dividing circuit.

The connection node is connected to the non-inverting input terminal of the comparator 5 via the switch SW2. Thus, by turning on the switch SW2, it is possible to input the envelope reference voltage ENVREF to the comparator 5. The ultrasonic signal is compared with an envelope threshold voltage in the comparator 5.

A power supply voltage VREG is applied to one end of a resistor R5. The other end of the resistor R5 is connected to one end of a resistor R6. The other end of the resistor R6 is connected to one end of a resistor R7. The other end of the resistor R7 is connected to the application terminal of the ground potential via the switch S2. A switch S3 is connected to both ends of the resistor R7. The switch S3 is turned on and off in response to a switching signal ERCNT. The switching signal ERCNT is set by the logic part 6. On and off of the switch S2 is switched by an analog signal ANG.

When the switch S2 is turned on, the bypass or non-bypass of the resistor R7 is switched in response to the on/off operation of the switch S3, whereby the voltage dividing ratio of dividing the power supply voltage VREG using the resistors R5 and R6 is adjusted. The voltage after division is generated as an error detection reference voltage ERREF at the connection node of the resistors R5 and R6. The connection node is connected to the non-inverting input terminal of the comparator 5 via the switch SW3. Thus, by turning on the switch SW3, it is possible to input the error detection reference voltage ERREF to the comparator 5. The ultrasonic signal is compared with an error detection threshold voltage in the comparator 5. The resistors R5 to R7, the switch S2 and the switch S3 constitute a second voltage dividing circuit.

As described above, the analog signal ANG is a signal for controlling the on/off operation of the switches S1 and S2 and also serves as a power supply voltage for the comparator 5. More specifically, when the analog signal ANG is a level for turning on the switches S1 and S2, the analog signal ANG is supplied to the comparator 5 as a power supply voltage. When the analog signal ANG is not at a level for turning on the respective switches S1 and S2, the power supply voltage is not supplied to the comparator 5. The analog signal ANG is set by the logic part 6.

As a result, when the sensor signal processing apparatus 200 does not perform a reception process of the sensor signal, the switches S1 and S2 are turned off by the analog signal ANG and the power supply voltage is not supplied to the comparator 5. This makes it possible to reduce unnecessary power consumption. Accordingly, when the ultrasonic sensor system 500 is operated by a battery (not shown), the power consumption of the battery can be suppressed and the battery can be used for a long time.

The switch control circuit 7 controls the on/off operations of the switches SW1 to SW3, respectively, according to a command from the logic part 6. Thus, it is possible to switch the threshold voltage to be compared with the ultrasonic signal in the comparator 5. A comparison signal CMP, which is a comparison result outputted from the comparator 5, is inputted to the logic part 6. The logic part 6 switches the switches SW1 to SW3 based on the comparison signal CMP. The switching timing of the switches SW1 to SW3 will be described in detail later.

3. Regarding Sensor Signal Processing

Figure 4:
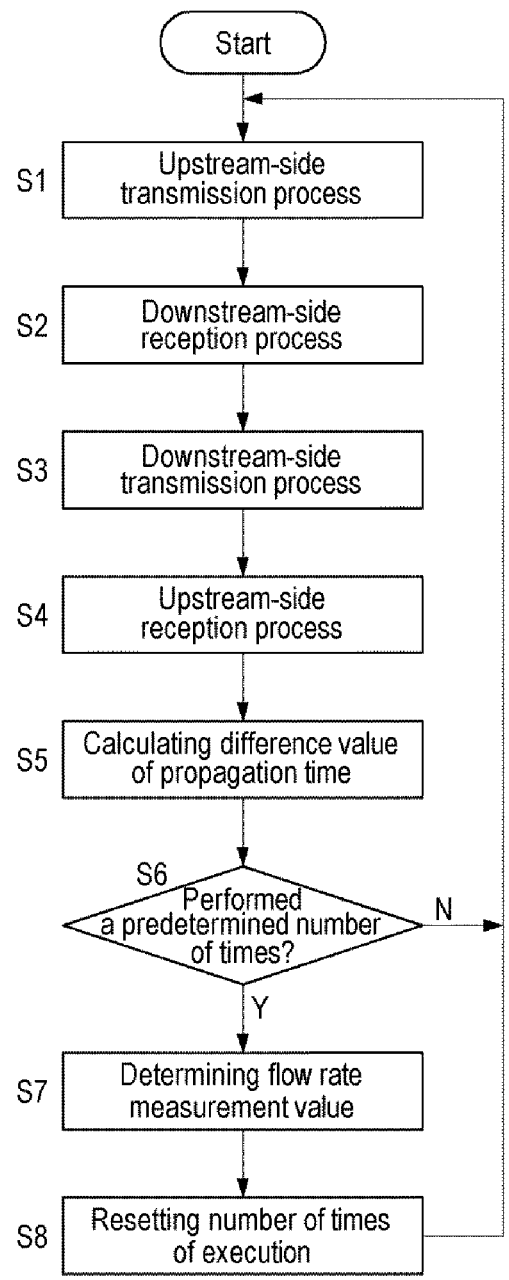
FIG. 4 is a flowchart showing a flow rate measurement process performed by a sensor signal processing apparatus.

Next, the sensor signal processing by the sensor signal processing apparatus 200 will be described with reference to various flowcharts of FIGS. 4 to 8. FIG. 4 is a flowchart showing a flow rate measurement process performed by the sensor signal processing apparatus 200.

Figure 9:
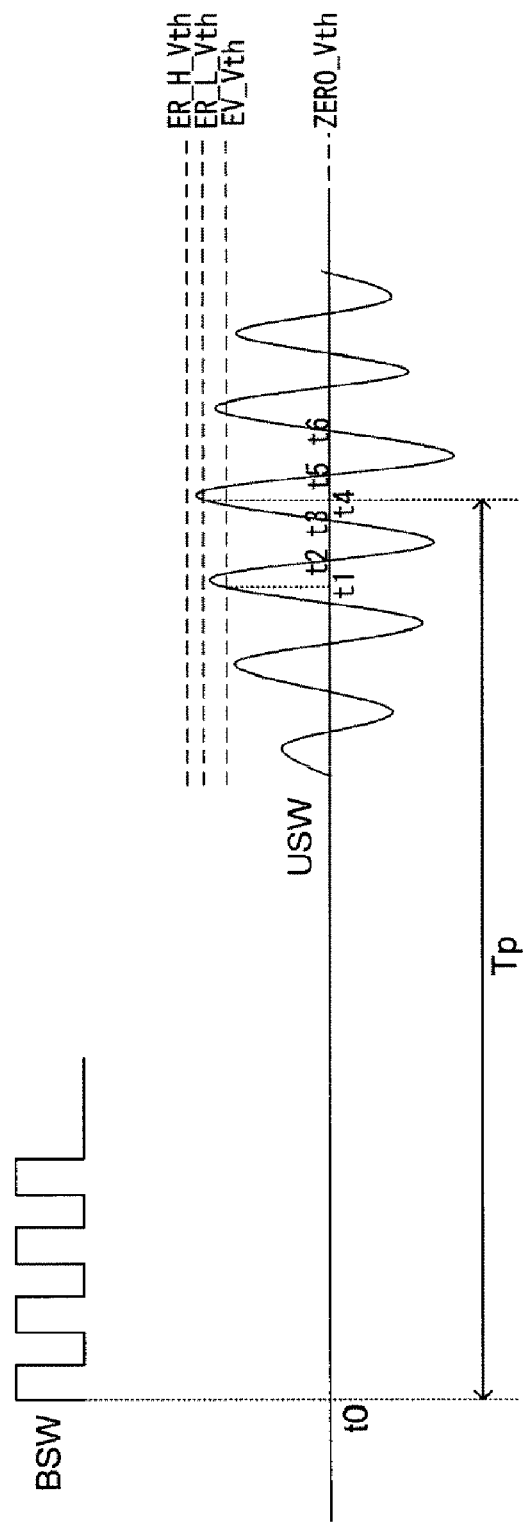
FIG. 9 is a timing chart showing an example of a burst wave and an ultrasonic signal.

When the flowchart of FIG. 4 is started, the sensor signal processing apparatus 200 first performs an upstream-side transmission process in step S1. The logic part 6 generates a burst wave for driving the first ultrasonic sensor 101 by driving the H Bridge (FIG. 3) composed of the switches Q1 to Q4 in the H-bridge circuit 1. As a result, an ultrasonic wave is output from the first ultrasonic sensor 101 on the upstream side into the pipe P1. FIG. 9 shows an example of the burst wave BSW thus generated.

At this time, the logic part 6 turns off the switches S1 and S2 by the analog signal ANG, thereby stopping the supply of the power supply voltage to the comparator 5.

After step S1, the process proceeds to step S2, and the sensor signal processing apparatus 200 performs a downstream-side reception process. The ultrasonic wave transmitted from the first ultrasonic sensor 101 on the upstream side is received by the second ultrasonic sensor 102 on the downstream side, and the sensor signal (ultrasonic signal) output from the second ultrasonic sensor 102 is processed. The ultrasonic signal outputted from the second ultrasonic sensor 102 is inputted to the I/V amplifier 2 via the switches 13 and 14 (FIG. 3), which are turned on in the H-bridge circuit 1, current/voltage-converted by the I/V amplifier 2, amplified by the first PGA3 and the second PGA4, level-adjusted by the reference voltage VREF, and then inputted to the inverting input terminal of the comparator 5.

In the downstream-side reception process, the logic part 6 turns on the switches S1 and S2 by the analog signal ANG and performs the supply of the power supply voltage to the comparator 5.

Figure 5:
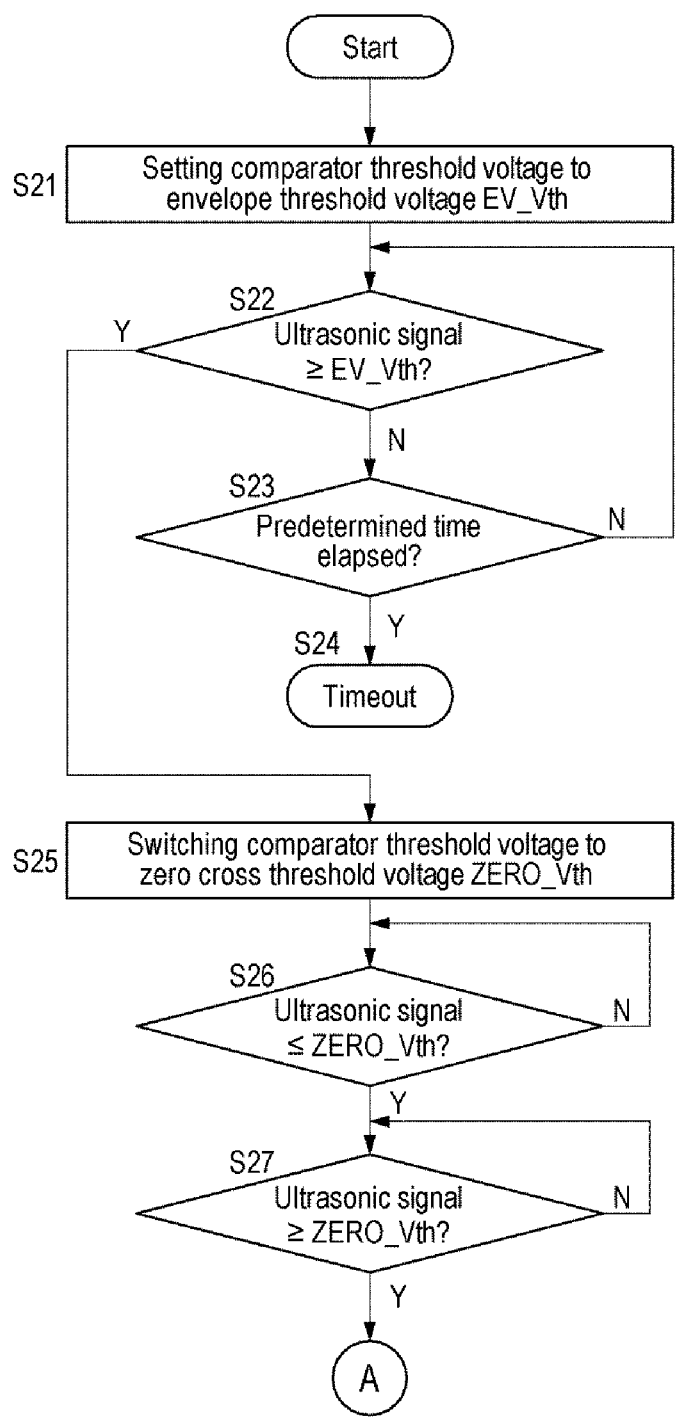
FIG. 5 is a flowchart showing some processing steps specifically performed in a signal reception process.

Here, the processing steps specifically performed in the reception process will be described with reference to the flowcharts of FIGS. 5 to 8. If the flowchart of FIG. 5 is started, in step S21, the logic part 6 first instructs the switch control circuit 7 to turn on the switch SW2 and to turn off the switches SW1 and SW3, thereby inputting the envelope reference voltage ENVREF to the non-inverting input terminal of the comparator 5. As a result, the threshold voltage to be compared with the ultrasonic signal is set to the envelope threshold voltage in the comparator 5.

FIG. 9 shows an example of the ultrasonic signal USW, which is generated at the inverting input terminal of the comparator 5 after a lapse of time from the generation of the burst wave BSW, as a waveform. In step S21, the envelope threshold voltage $EV_{13}$ Vth is set as shown in FIG. 9.

After step S21, in step S22, the logic part 6 determines whether the ultrasonic signal is equal to or larger than the envelope threshold voltage based on the comparison signal CMP outputted from the comparator 5. If the ultrasonic signal is not equal to or larger than the envelope threshold voltage (N in step S22) and if a predetermined time has not elapsed (N in step S23), the process returns to step S22. The predetermined time referred to above is the time elapsed from step S21.

If the level of the comparison signal CMP is switched from High to Low before the predetermined time elapses, the logic part 6 determines that the ultrasonic signal is equal to or larger than the envelope threshold voltage (Y in step S22), and the process proceeds to step S25. As a result, the signal inputted to the inverting input terminal of the comparator 5 before the ultrasonic signal does not reach the envelope threshold voltage is regarded as noise and ignored. The signal may be treated as an ultrasonic signal at a timing that the ultrasonic signal is equal to or larger than the envelope threshold voltage. In the example of FIG. 9, the ultrasonic signal USW is equal to or larger than the envelope threshold voltage EV_Vth at timing t1.

If the ultrasonic signal does not become equal to or larger than the envelope threshold voltage even after the lapse of the predetermined time (Y in step S23), in step S24, the logic part 6 interrupts the downstream-side reception process (step S2) due to a timeout and does not increase the number of times of execution. The process does not proceed to step S3 but returns to step S1.

If the process proceeds to step S25, the logic part 6 instructs the switch control circuit 7 to turn on the switch SW1 and to turn off the switches SW2 and SW3. As a result, the reference voltage VREF is inputted to the non-inverting input terminal of the comparator 5. That is, the threshold voltage used for comparison in the comparator 5 is switched to a zero cross threshold voltage. In the example of FIG. 9, the zero cross threshold voltage ZERO_Vth is set. For example, the zero cross threshold voltage ZERO_Vth (Vref) is set to 1.1 V.

In step S26, the logic part 6 determines whether the ultrasonic signal is equal to or smaller than the zero cross threshold voltage based on the comparison signal CMP outputted from the comparator 5. When the ultrasonic signal is not equal to or smaller than the zero cross envelope threshold voltage (N in step S26), the process returns to step S26. When the ultrasonic signal becomes equal to or smaller than the zero cross threshold voltage (Y in step S26), the process proceeds to step S27. In the example of FIG. 9, at timing t2, the ultrasonic signal USW becomes equal to or smaller than the zero cross threshold voltage ZERO_Vth.

The logic part 6 starts counting from the timing that begins to generate the burst wave in the upstream side signal transmission process (step S1), and performs the counting until the timing at which the ultrasonic signal becomes equal to or larger than the envelope threshold voltage (Y in step S22 and t1 in FIG. 9). In this counting, rough counting is performed. From the aforementioned timing, the logic part 6 starts fine counting and holds the elapsed time from the generation of the burst wave to the above-mentioned timing based on the count value until the timing at which the ultrasonic signal becomes equal to or smaller than the zero cross threshold voltage (Y in step S26 and t2 in FIG. 9) and the count value in the rough counting. That is, in the example of FIG. 9, the elapsed time (first elapsed time) from the timing t0 at which the burst wave BSW is generated to the timing t2 is held.

Figure 6:
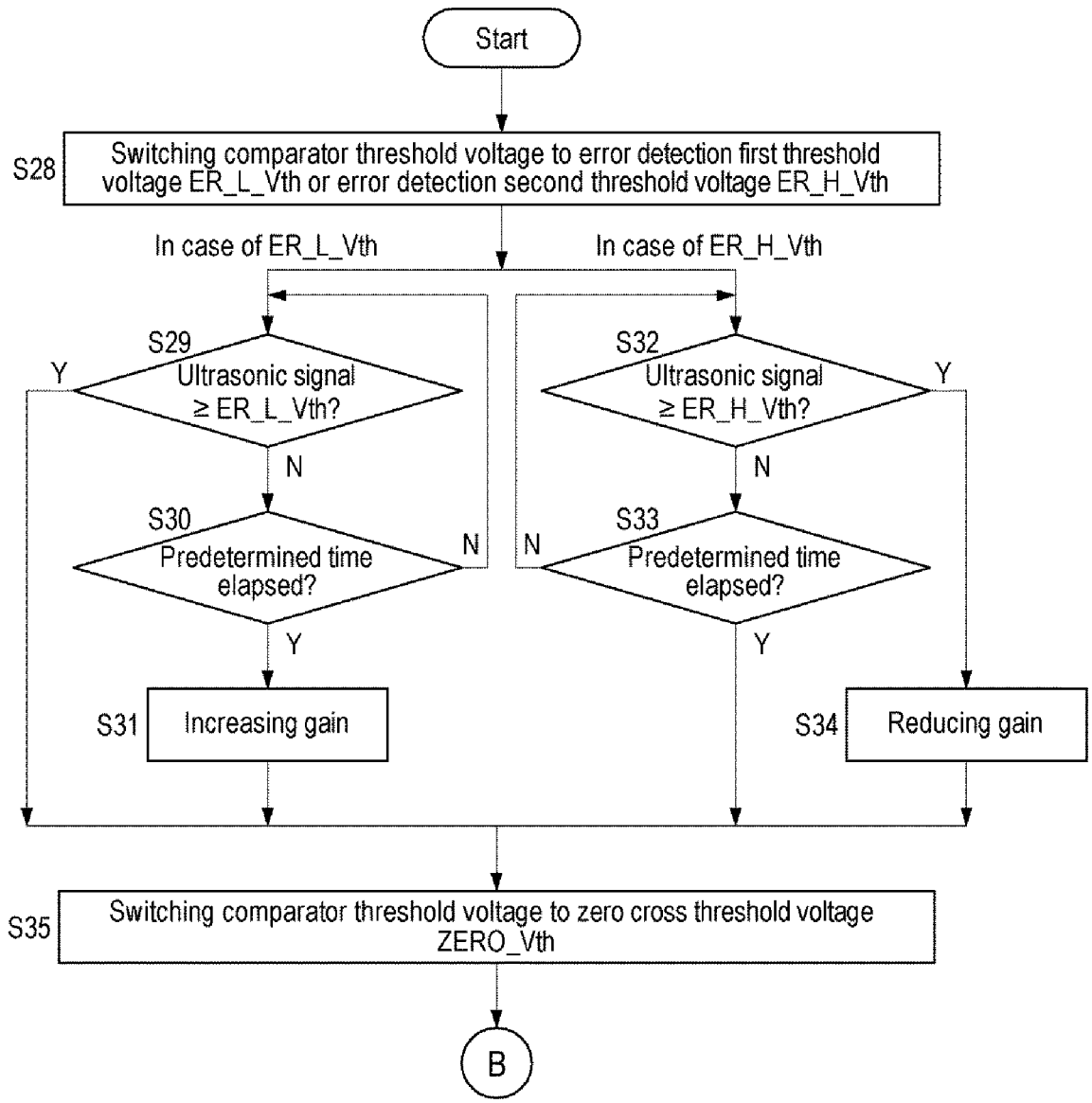
FIG. 6 is a flowchart showing some processing steps specifically performed in a signal reception process.

If the process proceeds to step S27, the logic part 6 determines whether the ultrasonic signal is equal to or larger than the zero cross threshold voltage based on the comparison signal CMP. When the ultrasonic signal is not equal to or larger than the zero cross threshold voltage (N in step S27), the process returns to step S27. When the ultrasonic signal is equal to or larger than the zero cross threshold voltage (Y in step S27), the process proceeds to step S28 (FIG. 6). In the example of FIG. 9, at the timing t3, the ultrasonic signal USW is equal to or larger than the zero cross threshold voltage ZERO_Vth. The threshold value for zero cross detection is maintained from the timing t1 to the timing t3 in FIG. 9.

The logic part 6 holds the elapsed time from the generation of the burst wave to the above-mentioned timing based on the count value from the start of the fine counting to the timing at which the ultrasonic signal becomes equal to or larger than the zero cross threshold voltage and the count value in the rough counting. That is, in the example of FIG. 9, the elapsed time (second elapsed time) from the timing t0 to the timing t3 is held.

If the process proceeds to step S28, the logic part 6 instructs the switch control circuit 7 to turn on the switch SW3 and to turn off the switches SW1 and SW2. As a result, the error detection reference voltage ERREF is inputted to the non-inverting input terminal of the comparator 5. That is, the threshold voltage used for comparison in the comparator 5 is switched to the error detection threshold voltage. By switching the level of the error detection reference voltage ERREF by the switching signal ERCNT, it is possible to set a first error-detection threshold voltage or a second error-detection threshold voltage as the threshold voltage. The second error-detection threshold voltage is higher in level than the first error-detection threshold voltage.

In the example of FIG. 9, the first error-detection threshold voltage ER_L_Vth and the second error-detection threshold voltage ER_H_Vth are shown. The first error-detection threshold voltage ER_L_Vth is set as the threshold voltage.

When the first error-detection first threshold voltage is set as the threshold voltage, in step S29, the logic part 6 determines whether the ultrasonic signal is equal to or larger than the first error-detection threshold voltage based on the comparison signal CMP. If not (N in step S29), the process proceeds to step S30. If a predetermined time has not elapsed (N in step S30), the process returns to step S29. The predetermined time is the time elapsed from step S28.

When the ultrasonic signal becomes equal to or larger than the first error-detection threshold voltage before the predetermined time elapses (Y in step S29), the process proceeds to step S35. In the example of FIG. 9, at the timing t4, the ultrasonic signal USW becomes equal to or larger than the first error-detection threshold voltage ER_L_Vth. On the other hand, if the predetermined time has elapsed before the ultrasonic signal becomes equal to or larger than the first error-detection threshold voltage (Y in step S30), the process proceeds to step S31. The logic part 6 increases the gain by the first PGA3 and the second PGA4 which are set according to the setting signal GS in the next downstream signal reception process (step S2). In the case of Y in step S29, the gain is maintained.

Meanwhile, when the second error-detection threshold voltage is set as the threshold voltage, in step S32, the logic part 6 determines whether the ultrasonic signal becomes equal to or larger than the error detection second threshold voltage based on the comparison signal CMP. If not (N in step S32), the process proceeds to step S33. If a predetermined time has not elapsed (N in step S33), the process returns to step S32. The predetermined time is the time elapsed from step S28.

When the ultrasonic signal becomes equal to or larger than the second error-detection threshold voltage before the predetermined time elapses (Y in step S32), the process proceeds to step S34. The logic part 6 is configured to reduce the gain by the first PGA3 and the second PGA4 which are set according to the setting signal GS in the next downstream-side reception process (step S2). On the other hand, if the predetermined time has elapsed before the ultrasonic signal becomes equal to or larger than the second error-detection threshold voltage (Y in step S33), the process proceeds to step S35. In this case, the gain is maintained.

In step S28, when the process proceeds to step S31 in the previous downstream-side reception process, the first error-detection threshold voltage is set. In the case of Y in step S29 in the previous downstream-side reception process, the second error-detection threshold voltage is set. In the case of Y in step S33 in the previous downstream-side reception process, the first error-detection threshold voltage is set. When the process proceeds to step S34 in the previous downstream-side reception process, the second error-detection threshold voltage is set.

The processes of steps S28 to S34 are performed every time when the downstream-side reception process (step S2) is repeated, whereby the ultrasonic signal is controlled at a level between the first error-detection threshold voltage and the second error-detection threshold voltage.

In the above description, the error detection is determination using one of the first error-detection threshold voltage ER_L_Vth and the second error-detection second threshold voltage ER_H_Vth. However, the determination may be made using both threshold values. In other words, it is determined whether the ultrasonic signal becomes equal to or larger than the first error-detection threshold voltage ER_L_Vth within a predetermined time from step S28. If the ultrasonic signal is equal to or larger than the first error-detection threshold voltage ER_L_Vth, the threshold voltage for error detection is switched to the second error-detection threshold voltage ER_H_Vth. It is determined whether the ultrasonic signal becomes equal to or larger than the second error-detection threshold voltage ER_H_Vth within a predetermined time from the timing switched to the second error-detection threshold voltage ER_H_Vth or within a predetermined time from step S28. If the ultrasonic signal is not equal to or larger than second the error-detection threshold voltage ER_H_Vth, the process directly proceeds to step S35. If the ultrasonic signal does not become equal to or larger than the first error-detection threshold voltage ER_L_Vth within the predetermined time, the gain is increased. If the ultrasonic signal becomes equal to or larger than second the error-detection threshold voltage ER_H_Vth within the predetermined time, the gain is reduced.

In the case of proceeding to step S31 or step S34, the logic part 6 stores a fact that the level of the ultrasonic signal is not appropriate and an error occurs. Even in the case of proceeding to step S31 or step S34, the process also proceeds to step S35.

As the threshold voltage of the comparator 5, the error detection threshold voltage is maintained within a predetermined time from step S28 (t3 in FIG. 9). During that time, the switch SW3 is turned on and the switches SW1 and SW2 are turned off If the process proceeds to step S35, the logic part 6 instructs the switch control circuit 7 to turn on the switch SW1 and to turn off the switches SW2 and SW3. As a result, the reference voltage VREF is inputted to both the inverting input terminal and the non-inverting input terminal of the comparator 5. That is, the threshold voltage used for comparison in the comparator 5 is switched to the zero cross threshold voltage. In the example of FIG. 9, the zero cross threshold voltage ZERO_Vth is set.

Figure 7:
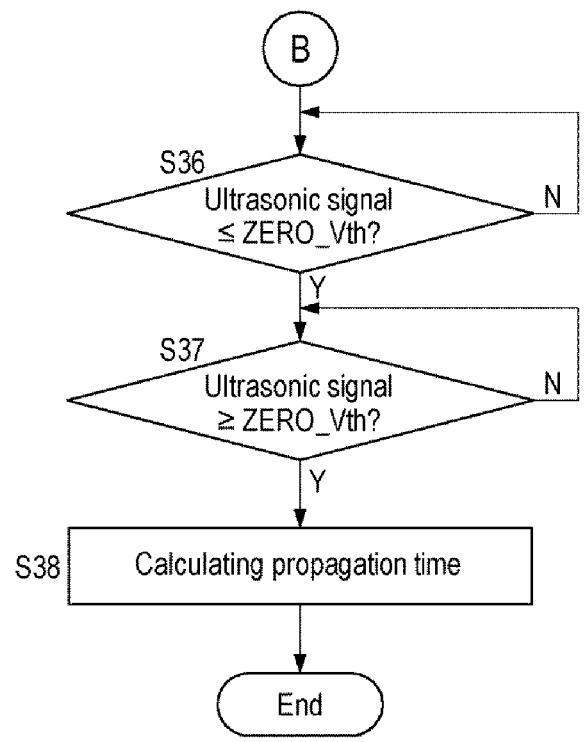
FIG. 7 is a flowchart showing some processing steps specifically performed in a signal reception process.

Then, the process proceeds to step S36 (FIG. 7). The logic part 6 determines whether the ultrasonic signal is equal to or smaller than the zero cross threshold voltage, based on the comparison signal CMP. When the ultrasonic signal is not equal to or smaller than the zero cross threshold voltage (N in step S36), the process returns to step S36. When the ultrasonic signal is equal to or smaller than the zero cross threshold voltage (Y in step S36), the process proceeds to step S37. In the example of FIG. 9, at timing t5, the ultrasonic signal USW becomes equal to or smaller than the zero cross threshold voltage ZERO_Vth.

The logic part 6 holds the elapsed time from the generation of the burst wave to the above-mentioned timing based on the count value from the start of the fine counting to the timing at which the ultrasonic signal becomes equal to or smaller than the zero cross threshold voltage and the count value in the rough counting. That is, in the example of FIG. 9, the elapsed time (third elapsed time) from the timing t0 to the timing t5 is held.

If the process proceeds to step S37, the logic part 6 determines whether the ultrasonic signal is equal to or larger than the zero cross threshold voltage based on the comparison signal CMP. When the ultrasonic signal is not equal to or larger than the zero cross threshold voltage (N in step S37), the process returns to step S37. When the ultrasonic signal becomes equal to or larger than the zero cross threshold voltage (Y in step S37), the process proceeds to step S38. In the example of FIG. 9, at the timing t6, the ultrasonic signal USW is equal to or larger than the zero cross threshold voltage ZERO_Vth.

The logic part 6 holds the elapsed time from the generation of the burst wave to the above-mentioned timing based on the count value from the start of the fine counting to the timing at which the ultrasonic signal becomes equal to or larger than the zero cross threshold voltage and the count value in the rough counting. That is, in the example of FIG. 9, the elapsed time (fourth elapsed time) from the timing t0 to the timing t6 is held.

In step S38, the logic part 6 calculates an average value of the four elapsed times (the first elapsed time to the fourth elapsed time) as the propagation time of the ultrasonic wave from the upstream side to the downstream side. In the example of FIG. 9, the propagation time Tp, which is an average value of the respective elapsed times from the timing t0 at which the burst wave BSW is generated to the respective timings t2, t3, t5 and t6, is calculated.

In step S38, the downstream-side reception process (step S2) is completed (ended). Thereafter, as shown in FIG. 4, the process proceeds to a downstream-side transmission process in step S3. The logic part 6 generates a burst wave for driving the second ultrasonic sensor 102 by driving an H bridge (FIG. 3) composed of switches Q5 to Q8 in the H-bridge circuit 1. As a result, an ultrasonic wave is outputted from the second ultrasonic sensor 102 on the downstream side into the pipe P1.

At this time, the logic part 6 turns off the switches S1 and S2 by the analog signal ANG, thereby stopping the supply of the power supply voltage to the comparator 5.

After step S3, the process proceeds to step S4. The sensor signal processing apparatus 200 performs an upstream-side reception process. The ultrasonic wave transmitted from the second ultrasonic sensor 102 on the downstream side is received by the first ultrasonic sensor 101 on the upstream side, and the sensor signal (ultrasonic signal) outputted from the first ultrasonic sensor 101 is processed. The ultrasonic signal outputted from the first ultrasonic sensor 101 is inputted to the I/V amplifier 2 via the switches 11 and 12 (FIG. 3), which are turned on in the H-bridge circuit 1, current/voltage-converted by the I/V amplifier 2, amplified by the first PGA3 and the second PGA4, level-adjusted by the reference voltage VREF, and then inputted to the inverting input terminal of the comparator 5.

In the upstream-side reception process, the logic part 6 turns on the switches S1 and S2 by the analog signal ANG, and performs the supply of the power supply voltage to the comparator 5.

The processing steps specifically performed in the upstream-side reception process are the same as the processing steps shown in the flowcharts of FIGS. 5 to 7 described above. That is, the logic part 6 instructs the switch control circuit 7 to perform the switching control of the switches SW1 to SW3, thereby switching the threshold voltage used for comparison in the comparator 5. In the case where it becomes a timeout proceeding in step S24 in FIG. 5, the process is stopped. The number of times of execution is not increased. The process does not proceed to step S5, but returns to step S1.

At this time, the processing of step S28 to step S34 (FIG. 6) is performed every time when the upstream-side reception process is performed. Thus, in the upstream-side reception process, the ultrasonic signal is controlled to be at a level between the first error-detection threshold voltage and the second error-detection threshold voltage. That is, the degree of attenuation of the ultrasonic wave varies depending on the propagation time of the ultrasonic wave. The ultrasonic wave is controlled such that the ultrasonic signal becomes the same level in the downstream-side reception process and the upstream-side reception process regardless of the flow velocity of the fluid. When the ultrasonic wave is not the same, the timing at which the ultrasonic signal becomes equal to or larger than the envelope threshold voltage is shifted, and the timing of the zero cross for acquiring the elapsed time is shifted. Therefore, there is a possibility that the propagation times respectively calculated in the downstream-side reception process and the upstream-side reception process become inappropriate for taking a difference. Accordingly, by controlling the ultrasonic signal to be the same level, it is possible to improve the accuracy of measurement of the flow rate of the fluid.

After the upstream-side reception process of step S4, the process proceeds to step S5. The logic part 6 calculates a difference value between the propagation times calculated in the downstream-side reception process (step S2) and the upstream-side reception process (step S4). When an error occurs in at least one of the downstream-side reception process and the upstream-side reception process, the logic part 6 also stores the error occurrence in association with the difference value. In addition, when the timeout of step S24 (FIG. 5) occurs in at least one of the downstream-side reception process and the upstream-side reception process, the difference value is not calculated and the occurrence of an error is stored.

Next, in step S6, the logic part 6 determines whether the processing of steps S1 to S5 has been performed a predetermined number of times. The predetermined number of times is, for example, 64 times. If the processing of steps S1 to S5 has not been performed a predetermined number of times (N in step S6), the process returns to step S1.

Figure 8:
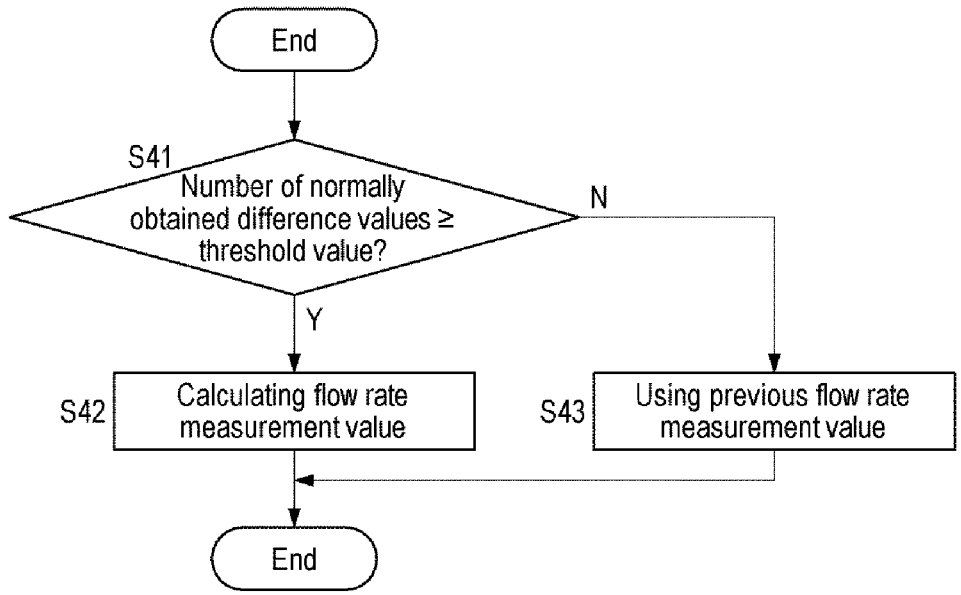
FIG. 8 is a flowchart relating to a flow rate measurement value determination process.

If the processing of steps S1 to S5 has been performed a predetermined number of times (Y in step S6), the process proceeds to step S7. In step S7, specifically, the processing steps of the flowchart shown in FIG. 8 are performed. Initially, in step S41, the logic part 6 determines whether the number of difference values (step S5) between the propagation times, which are obtained without occurrence of an error by executing the processing of steps S1 to S5 a predetermined number of times, is equal to or larger than a predetermined threshold value. This threshold value may be, for example, a half of the predetermined number of times (that is, when the predetermined number of times is 64 times, the threshold value may be 32).

If normal difference values of which number is equal to or larger than the threshold value, are obtained (Y in step S41), the logic part 6 calculates an average value of all the difference values obtained by executing the processing of steps S1 to S5 a predetermined number of times, and calculates the flow rate of the fluid based on the calculated average value. The calculated flow rate is determined as a current flow rate measurement value. On the other hand, when there are the normal difference values of which number does not reach the threshold value (N in step S41), there is a possibility that the accuracy is not good if the flow rate is calculated based on the difference values. Therefore, the logic part 6 does not calculate the flow rate and determines the previous flow rate measurement value as the current flow rate measurement value.

After the flow rate measurement value is determined in step S7 as described above, the process proceeds to step S8. The logic part 6 resets the number of execution times of steps S1 to S5. The process returns to step S1.

As described above, according to the sensor signal processing apparatus 200 of the present embodiment, in the downstream-side reception process and the upstream-side reception process, the threshold voltage to be compared with the ultrasonic signal in the comparator 5 can be switched to the envelope threshold voltage for noise removal, the error detection threshold voltage for level adjustment and the zero cross threshold voltage. Therefore, it is possible to accurately calculate the difference value between the respective propagation times between the upstream side and the downstream side, and to accurately measure the flow rate of the fluid.

In the above-described embodiment, the average value of the respective elapsed times at the timings of four points (t2, t3, t5 and t6 in FIG. 9) at which the ultrasonic signal intersects the zero cross threshold voltage is calculated and used as the propagation time. However, the present disclosure is not limited thereto. For example, in the case of FIG. 9, the average value of the respective elapsed times at arbitrary two points among the timings t2, t3, t5 and t6 may be calculated, or the elapsed time at any one point may be used as the propagation time.

Furthermore, the envelope threshold voltage may be a fixed value and may be adjusted by the logic part 6 as follows. The envelope threshold voltage is raised and changed whenever the downstream-side reception process or the upstream-side reception process is performed. At this time, when the change amount from the propagation time calculated at a previous time to the propagation time calculated at this time is equal to or larger than a threshold value, a set value (first set value) of the present envelope threshold voltage is stored. If the envelope threshold voltage is raised, the envelope threshold voltage exceeds a vertex of a certain waveform protruding upward from the zero cross level of the ultrasonic signal, so that the ultrasonic signal becomes equal to or larger than the envelope threshold voltage in a waveform temporally adjacent to the certain waveform. Therefore, the timing of four points at which the ultrasonic signal intersects the zero cross threshold voltage is shifted, and the calculated propagation time is changed greatly. That is, the first set value corresponds to the vertex of the certain waveform.

After storing the first set value, the envelope threshold voltage is further raised and changed. When the change amount from the propagation time calculated at a previous time to the propagation time calculated this time becomes equal to or larger than the threshold value again, a set value (second set value) of the present envelope threshold voltage is stored. The second set value corresponds to the vertex of the waveform temporally adjacent to a certain waveform. Then, the midpoint of the first set value and the second set value is determined as an envelope threshold voltage. The envelope threshold voltage may be changed by controlling the electronic volume 8 using the setting signal DPM.

By adjusting the envelope threshold voltage in this manner, it is possible to suppress the temporal deviation of the waveform of the ultrasonic signal to be equal to or larger than the envelope threshold voltage and to suppress the adverse effect on the calculated propagation time.

4. Comparison with Comparative Example

Figure 10:
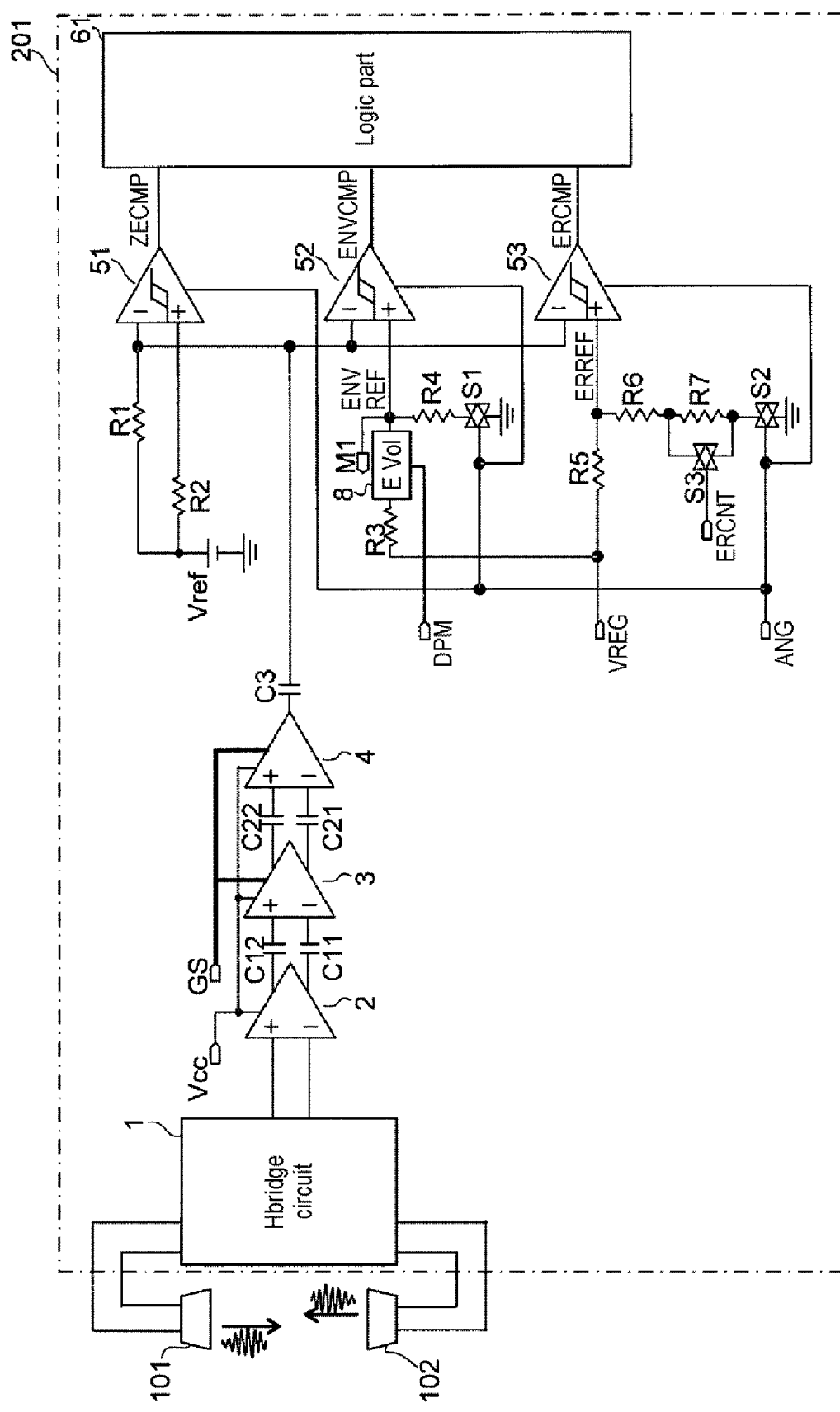
FIG. 10 is a diagram showing a configuration of a sensor signal processing apparatus according to a comparative example.

FIG. 10 is a diagram showing a configuration of a sensor signal processing apparatus 201 according to a comparative example for comparison with the present embodiment. The sensor signal processing apparatus 201 differs in configuration from the sensor signal processing apparatus 200 (FIG. 2) according to the present embodiment in that the sensor signal processing apparatus 201 includes a first comparator 51, a second comparator 52 and a third comparator 53.

Output terminals of the second PGA4 are connected to the inverting input terminals of the first comparator 51 to the third comparator 53, respectively. That is, an ultrasonic signal is inputted to each of the inverting input terminals. A reference voltage Vref is inputted to the non-inverting input terminal of the first comparator 51, an envelope reference voltage ENVREF is inputted to the non-inverting input terminal of the second comparator 52, and an error detection reference voltage ERREF is inputted to the non-inverting input terminal of the third comparator 53.

A comparison signal ZECMP outputted from the first comparator 51, a comparison signal ENVCMP outputted from the second comparator 52 and a comparison signal ERCMP outputted from the third comparator 53 are respectively inputted to the logic part 61.

According to the configuration of the sensor signal processing apparatus 201 in the comparative example, in the processing steps shown in FIGS. 5 to 7, instead of switching the threshold voltages of the comparator in steps S21, S25, S28 and S35, the logic part 61 may refer to the comparison signals ZECMP, ENVCMP and ERCMP. This makes it possible to perform the same processing as in the present embodiment.

However, three comparators are used in the sensor signal processing apparatus 201 according to the comparative example. Therefore, in the present embodiment using one comparator 5, it is possible to reduce the circuit area of the sensor signal processing apparatus and to reduce the cost.

Furthermore, in the sensor signal processing apparatus 201 according to the comparative example, it is necessary to perform matching such that the delays of the three comparators are not shifted relative to each other, which causes a problem that the comparator circuit itself becomes larger in size. In contrast, according to the present embodiment, only one comparator is used. Therefore, design considering the relative variations of the delay is not necessary. It is possible to downsize the comparator circuit itself and to widen the selection range of the manufacturing process. Even if there is a delay in the comparator of the present embodiment, the delay amount is canceled out because the flow rate is calculated based on the difference in the propagation time.

5. Other

While the embodiments of the present disclosure have been described above, various modifications may be made to the embodiments within the scope of the present disclosure. For example, a sensor capable of transmitting and receiving a vibration signal other than the ultrasonic wave may be used as the sensor system.

The present disclosure may be applied to, for example, an ultrasonic sensor system.

According to the present disclosure in some embodiments, it is possible to accurately measure a flow rate of a fluid and to achieve size reduction and cost reduction.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A signal processing apparatus for processing a signal, comprising:
   a comparator having one input terminal to which a signal is inputted;
   a first switch configured to switch between application and non-application of a reference voltage for setting a zero cross threshold voltage to the other input terminal of the comparator;
   a second switch configured to switch between application and non-application of an envelope reference voltage for setting an envelope threshold voltage to the other input terminal;
   a third switch configured to switch between application and non-application of an error detection reference voltage for setting an error detection threshold voltage to the other input terminal; and
   a controller configured to perform switching control of the first switch, the second switch and the third switch based on an output of the comparator.

2. The apparatus of claim 1, further comprising an amplifier configured to amplify the signal,
   wherein the controller is configured to switch the error detection reference voltage at two levels, and
   wherein the controller is configured to adjust a gain of the amplifier according to the output of the comparator in a state in which the error detection reference voltage is applied to the other input terminal.

3. The apparatus of claim 2, wherein the controller is configured to change a voltage dividing ratio by switching between bypassing and non-bypassing both ends of a resistor to switch the error detection reference voltage.

4. The apparatus of claim 1, wherein the controller is configured to calculate a propagation time of a signal for a predetermined distance based on a plurality of timings at which the signal inputted to the one input terminal intersects the zero cross threshold voltage.

5. The apparatus of claim 4, wherein the controller is configured to:
   cause the zero cross threshold voltage to be applied to the other input terminal when the signal inputted to the one input terminal becomes equal to or larger than the envelope threshold voltage;
   cause the error detection threshold voltage to be applied to the other input terminal when the signal inputted to the one input terminal becomes equal to or larger than the zero cross threshold voltage; and then
   cause the zero cross threshold voltage to be applied to the other input terminal.

6. The apparatus of claim 1, wherein when the signal inputted to the one input terminal does not become equal to or larger than the envelope threshold voltage before a lapse of a predetermined time, the controller is configured to stop a process of performing the switching control.

7. The apparatus of claim 1, wherein the controller is configured to:
   change the envelope threshold voltage to search for the envelope threshold voltage at which a change amount of a propagation time based on a timing at which the signal inputted to the one input terminal intersects the zero cross threshold voltage becomes equal to or larger than a threshold value; and
   determine the envelope threshold voltage based on the searched envelope threshold voltage.

8. The apparatus of claim 1, wherein the controller is configured to calculate a propagation time of a signal for a predetermined distance based on a timing at which the signal inputted to the one input terminal intersects the zero cross threshold voltage, and calculates difference values of the calculated propagation time, and
   wherein the controller is configured to determine whether the number of difference values calculated in a state in which an error based on the error detection threshold voltage does not occur is equal to or larger than a threshold value, and switch between calculation and non-calculation of a flow rate based on the difference values according to a determination result.

9. The apparatus of claim 1, further comprising:
   a first voltage dividing circuit configured to generate the envelope threshold voltage; and a second voltage dividing circuit configured to generate the error detection threshold voltage, wherein the controller is configured to perform switching of a switch included in the first voltage dividing circuit and switching of a switch included in the second voltage dividing circuit, and perform switching of a signal serving as a power supply voltage supplied to the comparator.

10. The apparatus of claim 1, further comprising:

an H-bridge circuit; and a converter configured to current/voltage-convert a signal outputted via the H-bridge circuit, wherein an output of the converter is inputted to the one input terminal.

11. The apparatus of claim 1, wherein the signal is an ultrasonic signal.

12. A system, comprising:

the signal processing apparatus of claim 1.

* * * * *